United States Patent
Park et al.

(10) Patent No.: US 12,283,999 B2
(45) Date of Patent: Apr. 22, 2025

(54) SYSTEMS AND METHODS FOR CROSSTALK SUPPRESSION

(71) Applicant: Samsung Electronics Co., Ltd., Suwon-si (KR)

(72) Inventors: Joung Won Park, San Diego, CA (US); Jaehyup Kim, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 33 days.

(21) Appl. No.: 18/176,356

(22) Filed: Feb. 28, 2023

(65) Prior Publication Data

US 2024/0235610 A1 Jul. 11, 2024

Related U.S. Application Data (60) Provisional application No. 63/437,928, filed on Jan. 9, 2023.

(51) Int. Cl.
*H04L 25/00* (2006.01)
*H04B 3/32* (2006.01)

(52) U.S. Cl.
CPC .................... *H04B 3/32* (2013.01)

(58) Field of Classification Search
CPC ...... H04B 3/32; H04B 3/487; H01R 13/6467; H01R 13/6461; H04J 1/12; H04J 3/10; H04L 12/2861
USPC ........................................................ 375/257
See application file for complete search history.

(56) References Cited

U.S. PATENT DOCUMENTS

| | | | |
|---|---|---|---|
| 7,847,583 B2 | 12/2010 | Kim et al. | |
| 8,723,619 B2 | 5/2014 | Weiß | |
| 8,958,544 B2 * | 2/2015 | Mermans | H04B 3/32 379/406.06 |
| 9,276,528 B2 | 3/2016 | Kaehs et al. | |
| 9,608,573 B2 | 3/2017 | Wang et al. | |
| 2012/0242382 A1 * | 9/2012 | Tsuchiya | H03L 7/00 327/153 |
| 2017/0003733 A1 | 1/2017 | Banowetz | |
| 2020/0313722 A1 | 10/2020 | McCall et al. | |
| 2022/0190875 A1 * | 6/2022 | Razavi Majomard | H04B 3/21 |
| 2023/0232155 A1 * | 7/2023 | Dhanasekaran | H04R 3/04 381/94.1 |
| 2024/0086352 A1 * | 3/2024 | Sumesaglam | H03K 5/1252 |

FOREIGN PATENT DOCUMENTS

WO  WO 2016/134739 A1  9/2016

OTHER PUBLICATIONS

European Search Report for EP Application No. 24150635.1 dated Jun. 20, 2024, 8 pages.

* cited by examiner

*Primary Examiner* — Khai Tran
(74) *Attorney, Agent, or Firm* — Lewis Roca Rothgerber Christie LLP (57) ABSTRACT

Systems and methods for crosstalk suppression. According to an embodiment of the present disclosure, there is provided a system, including: a first communications channel; and a first crosstalk reduction circuit, the first communications channel being a wired communications channel, and the first crosstalk reduction circuit being configured to: receive a signal from a second communications channel; and modify a signal in the first communications channel to reduce an effect of crosstalk from the second communications channel.

20 Claims, 7 Drawing Sheets

SYSTEMS AND METHODS FOR CROSSTALK SUPPRESSION

CROSS-REFERENCE TO RELATED APPLICATION(S)

The present application claims priority to and the benefit of U.S. Provisional Application No. 63/437,928, filed Jan. 9, 2023, entitled "ADJACENT CHANNEL SIGNAL CANCELLATION", the entire content of which is incorporated herein by reference.

FIELD

One or more aspects of embodiments according to the present disclosure relate to communications channels, and more particularly to systems and methods for crosstalk suppression in communications channels.

BACKGROUND

Arrays of communications channels may be used in various applications. For example, in various digital systems, subsystems may communicate with each other over arrays of serial communications channels.

It is with respect to this general technical environment that aspects of the present disclosure are related.

SUMMARY

According to an embodiment of the present disclosure, there is provided a system, including: a first communications channel; and a first crosstalk reduction circuit, the first communications channel being a wired communications channel, and the first crosstalk reduction circuit being configured to: receive a signal from a second communications channel; and modify a signal in the first communications channel to reduce an effect of crosstalk from the second communications channel.

In some embodiments, the first crosstalk reduction circuit includes an amplifier circuit having an input configured to be connected to a conductor of the second communications channel and an output connected to a conductor of the first communications channel.

In some embodiments: the first crosstalk reduction circuit includes an amplifier circuit having an input configured to be connected to a conductor of the second communications channel and an output connected to a conductor of the first communications channel; and the conductor of the first communications channel is at least one of: an output of a receiver of the first communications channel, and an output of a transmitter of the first communications channel.

In some embodiments: the first crosstalk reduction circuit includes an amplifier circuit connected to the first communications channel, and the amplifier circuit has at least one of: an adjustable delay, and an adjustable gain.

In some embodiments: the first crosstalk reduction circuit includes an amplifier circuit connected to the first communications channel, and the system further includes at least one of: an adjusting circuit configured to adjust an adjustable delay of the amplifier circuit, and an adjusting circuit configured to adjust an adjustable gain of the amplifier circuit.

In some embodiments, the system further includes a peak detector configured to be connected to a conductor of the first communications channel, and a Least Mean Squares engine connected to the peak detector.

In some embodiments, the system further includes: the second communications channel; and a second crosstalk reduction circuit, the second crosstalk reduction circuit being configured to: receive a signal from the first communications channel; and modify a signal in the second communications channel to reduce an effect of crosstalk from the first communications channel.

In some embodiments, the system further includes: the second communications channel; and a second crosstalk reduction circuit, wherein the second crosstalk reduction circuit includes an amplifier circuit having an input configured to be connected to a conductor of the first communications channel and an output connected to a conductor of the second communications channel.

In some embodiments, the system further includes: the second communications channel; a second crosstalk reduction circuit; and an adjusting circuit, wherein the adjusting circuit is configured: to set a gain setting of an amplifier circuit of the second crosstalk reduction circuit to be equal to a gain setting of an amplifier circuit of the first crosstalk reduction circuit; and to set a delay setting of an amplifier circuit of the second crosstalk reduction circuit to be equal to a delay setting of an' amplifier circuit of the first crosstalk reduction circuit.

In some embodiments, the system further includes: the second communications channel; and a second crosstalk reduction circuit, wherein the first communications channel is a Pulse Amplitude Modulation (PAM) communications channel or a non-return-to-zero channel.

In some embodiments, the system further includes: the second communications channel; a peak detector; and a Least Mean Squares engine, the peak detector is configured to be connected to a conductor of the second communications channel; and the Least Mean Squares engine is connected to the peak detector.

In some embodiments, the first communications channel is a Pulse Amplitude Modulation (PAM) communications channel or a non-return-to-zero channel.

According to an embodiment of the present disclosure, there is provided a method, including: reducing an effect of crosstalk in a system including: a first communications channel; and a crosstalk reduction circuit, the crosstalk being crosstalk in the first communications channel from a second communications channel, the reducing including: receiving, by the crosstalk reduction circuit, a signal from the second communications channel; and modifying, by the crosstalk reduction circuit, a signal in the first communications channel to reduce an effect of crosstalk from the second communications channel.

In some embodiments, the crosstalk reduction circuit includes an amplifier circuit having an input configured to be connected to a conductor of the second communications channel and an output connected to a conductor of the first communications channel.

In some embodiments: the crosstalk reduction circuit includes an amplifier circuit having an input configured to be connected to a conductor of the second communications channel and an output connected to a conductor of the first communications channel; and the conductor of the first communications channel is at least one of: an output of a receiver of the first communications channel, and an output of a transmitter of the first communications channel.

In some embodiments: the crosstalk reduction circuit includes an amplifier circuit having an input configured to be connected to a conductor of the second communications channel and an output connected to a conductor of the first communications channel; and the amplifier circuit has an adjustable delay and an adjustable gain.

In some embodiments: the crosstalk reduction circuit includes an amplifier circuit having an adjustable delay and an adjustable gain; and the system further includes: an adjusting circuit configured to adjust the adjustable delay of the amplifier circuit, and an adjusting circuit configured to adjust the adjustable gain of the amplifier circuit.

In some embodiments: the system further includes a peak detector and a Least Mean Squares engine; the peak detector is configured to be connected to a conductor of the first communications channel; and the Least Mean Squares engine is connected to the peak detector.

In some embodiments: the crosstalk reduction circuit includes an amplifier circuit having an adjustable delay and an adjustable gain; and the method includes: turning off a transmitter in the first communications channel; and adjusting the adjustable delay or the adjustable gain to reduce a signal at an output of the first communications channel. According to an embodiment of the present disclosure, there is provided a system, including: a first communications channel; a crosstalk reduction circuit; a processing circuit; and memory, operatively connected to the processing circuit, the crosstalk reduction circuit being configured to: receive a signal from a second communications channel, and modify a signal in the first communications channel to reduce an effect of crosstalk from the second communications channel; and the memory storing instructions that, when executed by the processing circuit, cause the system to perform a method, the method including: turning off a transmitter in the first communications channel, and adjusting an adjustable delay of the processing circuit or an adjustable gain of the processing circuit to reduce a signal at an output of the first communications channel.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of systems and methods for crosstalk suppression provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In various applications, subsystems of digital systems may communicate via arrays of serial communications channels. For example, in a persistent storage device, two semiconductor dies within a flash memory controller may communicate over an array of serial communications channels such as Universal Chiplet Interconnect express (UCIe) connections. Similarly, dies in High Bandwidth Memory (HBM) may communicate via arrays of serial communications channels constructed according to embodiments of the present disclosure.

In such a system, crosstalk between the channels may degrade the performance of any of the channels, and may, for example, limit the distances over which data may be transmitted, or the data rates at which data may be transmitted. The crosstalk may have the effect of coupling a signal being transmitted in a source channel into an affected channel, e.g., by capacitive or inductive coupling between a conductor of the source channel and a conductor of the affected channel. In some systems, data may be transmitted in each of the communications channels using, e.g., Pulse Amplitude Modulation (PAM) (e.g., 4-level Pulse Amplitude Modulation (PAM-4)); such a system may be more vulnerable (than, e.g., a system using non-return-to-zero (NRZ) modulation) to crosstalk.

As such, in some embodiments, a crosstalk reduction circuit is used to reduce the effects of crosstalk. The crosstalk reduction circuit may receive a signal from the source channel, and modify the signal in the affected channel so as to reduce the effect of crosstalk in the affected channel. For example, the crosstalk reduction circuit may include an amplifier having an input connected to a conductor in the source channel (so that the signal amplified by the amplifier is, e.g., proportional to the signal propagating in the source channel (and causing the crosstalk)). The output of the amplifier may be connected to a conductor in the affected channel, so that, for example, the signal at the output of the amplifier is summed with the signal propagating in the affected channel. If the gain and delay of the amplifier are suitably adjusted, then crosstalk may be reduced, e.g., the modifying of the signal in the affected channel may include (e.g., consist of) adding to the signal in the affected channel a correction signal that partially or entirely cancels the signal coupled from the source channel into the affected channel by the crosstalk.

For adjacent channels in which signals are travelling in the same direction, the crosstalk reduction circuit may, for example, receive a signal at the transmitter end of the source channel and add it to a signal at the transmitter end of the affected channel, or it may receive a signal at the receiver end of the source channel and add it to a signal at the receiver end of the affected channel. For channels in which the signals are propagating in opposite directions, the crosstalk reduction circuit may, for example, receive a signal at the receiver end of the source channel and add it to a signal at the transmitter end of the affected channel, or it may receive a signal at the transmitter end of the source channel and add it to a signal at the receiver end of the affected channel.

The crosstalk reduction circuit may include one or more elements (e.g., amplifiers) with adjustable gain and adjustable delay. These adjustable parameters may be adjusted during an initialization procedure, in which the transmitter in the affected channel may be turned off, the transmitter in the source channel may be turned on, and the gain and delay may be adjusted to minimize the total signal in the affected channel. The minimization may be performed, for example, using a Least Mean Squares engine.

Figure 1A:
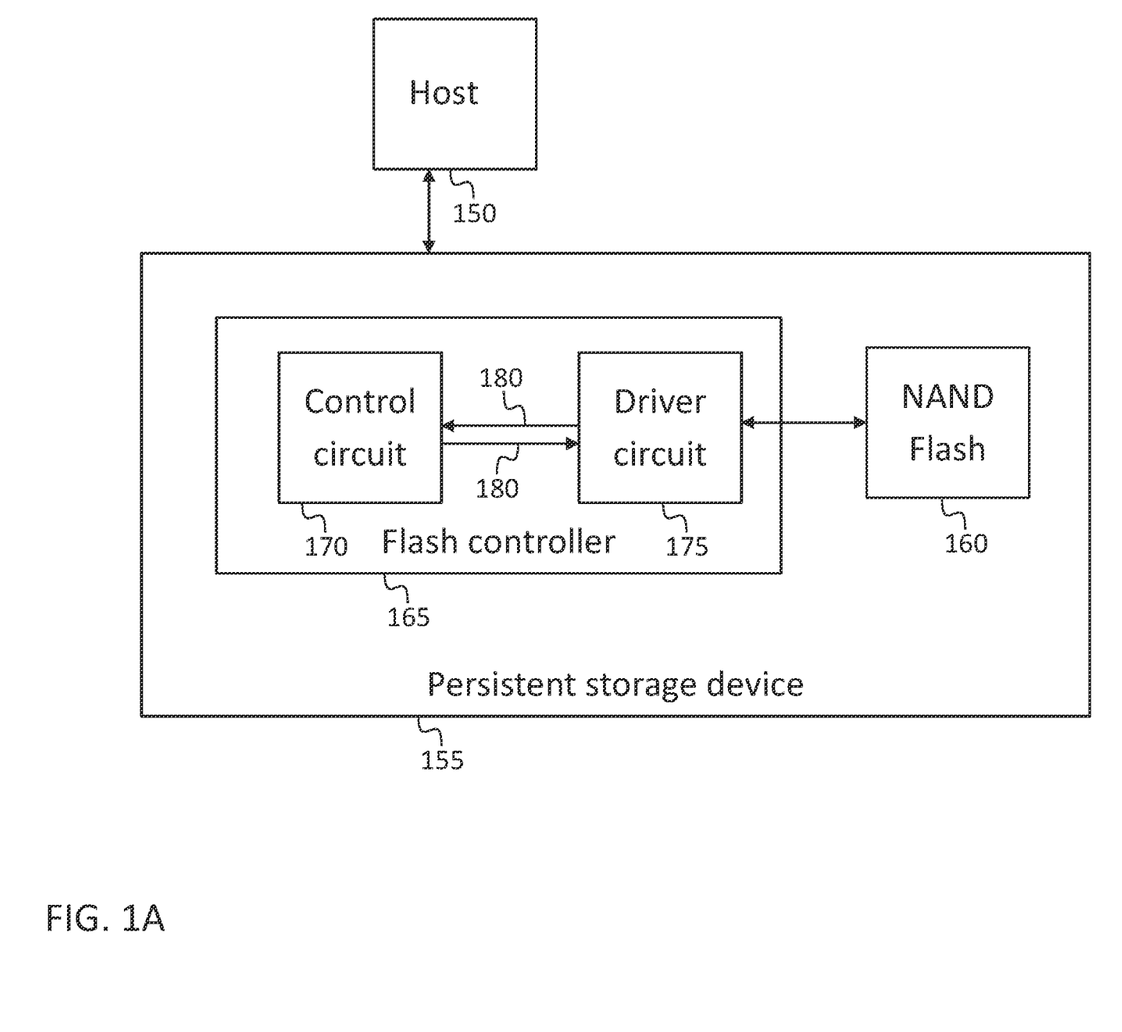
FIG. 1A is a system-level diagram for a data storage system environment, according to an embodiment of the present disclosure.

FIG. 1A is a system-level diagram for a data storage system environment, according to some embodiments. A host 150 includes or is connected to a persistent storage device 155, e.g., through a connection that may be a Nonvolatile Memory Express (NVMe) connection. The persistent storage device 155 may include nonvolatile (persistent) storage media such as not-AND (NAND) flash media 160. To perform read or write operations in the flash media 160, a flash controller 165 may send suitable commands to the flash media, over, e.g., an interface that may conform with the Open NAND Flash Interface (ONFI) standard. The flash controller 165 may include a control circuit 170 (which may be a digital (e.g., complimentary metal oxide semiconductor (CMOS)) circuit for formatting and queueing data), and a driver circuit 175 for generating signals (e.g., signals including voltages higher than those readily achieved in the control circuit 170) for reading data from and writing data to the flash media 160. The control circuit 170 and the driver circuit 175 may be separate dies, fabricated by different fabrication processes. They may be packaged together in a single package and connected through two or more (short) serial channels 180. Each of the control circuit 170 and the driver circuit 175 may include one or more transmitters and one or more receivers including crosstalk reduction circuits according to embodiments disclosed herein.

Figure 1B:
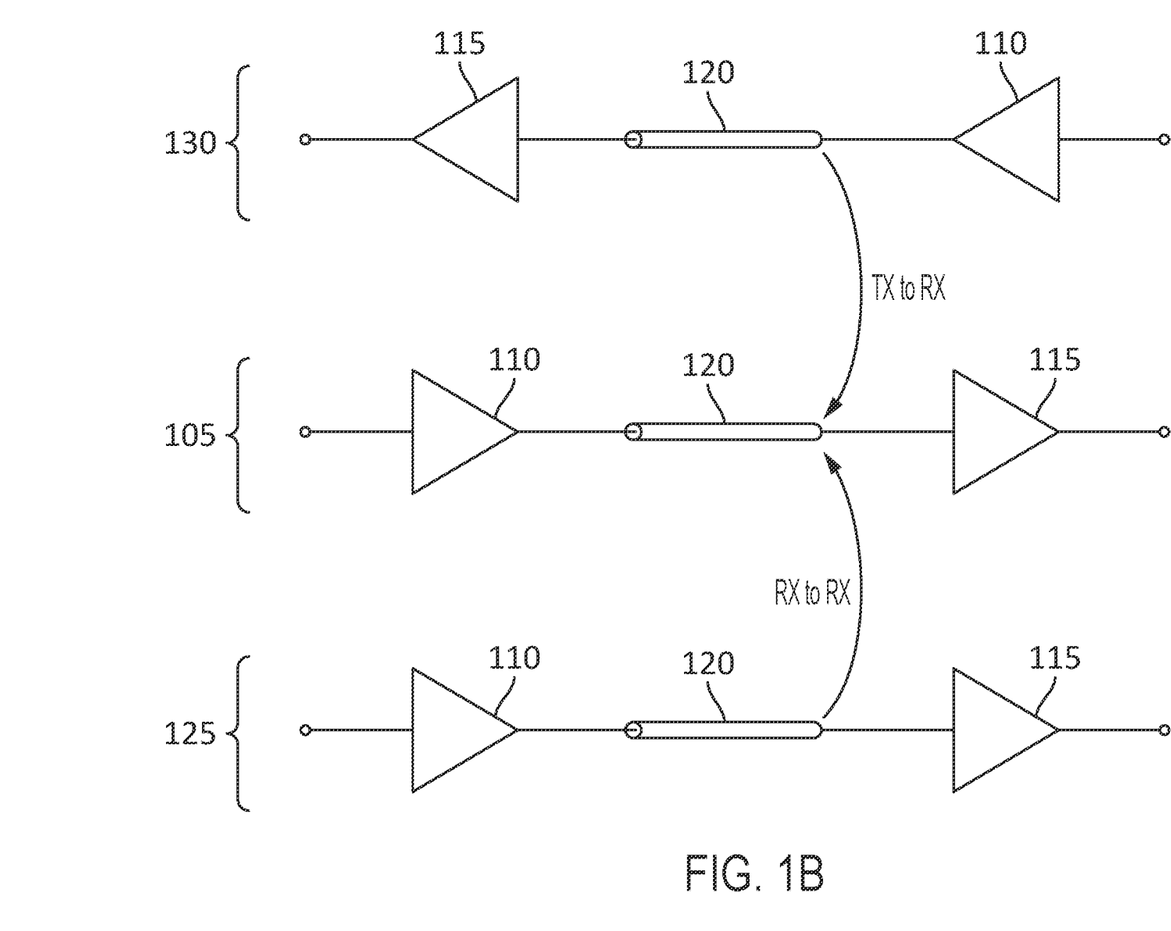
FIG. 1B is a schematic drawing of a portion of an array of communications channels, according to an embodiment of the present disclosure.

FIG. 1B is a schematic drawing of a portion of an array of communications channels, in some embodiments. A first channel (e.g., a wired communications channel), which may be referred to as an affected communications channel 105, is configured to transmit data from left to right (in the orientation of FIG. 1B) (e.g., from a transmitter 110 to a receiver 115, through one or more electrical conductors 120). The electrical conductors 120 may form a transmission line (e.g., a coaxial transmission line as illustrated, or a (balanced or single-ended) coplanar, stripline, or microstrip transmission line. A second channel, which may be referred to as a first source channel 125 (which may also include a transmitter 110 transmitting a signal to a receiver 115, through one or more electrical conductors 120) may also be configured to transmit data from left to right (in the orientation of FIG. 1B), and it may, for this reason, be referred to as a co-propagating source channel. A third channel, which may be referred to as a second source channel 130 (which may also include a transmitter 110 transmitting a signal to a receiver 115, through one or more electrical conductors 120) may be configured to transmit data from right to left (in the orientation of FIG. 1B), and it may, for this reason, be referred to as a counter-propagating source channel.

Crosstalk may occur from the transmitting or receiving end of the co-propagating source channel 125, or from the transmitting or receiving end of the counter-propagating source channel 130. The crosstalk caused by coupling from the transmitting end of the counter-propagating source channel 130 may be significantly greater (e.g., 5 dB greater) than the crosstalk caused by coupling from either end of the co-propagating source channel 125 because loss in the electrical conductors 120 may be about 5 dB, so that (if the amplitudes of the signals at the outputs of all of the transmitters are about the same) the amplitude of the signal, in the counter-propagating source channel 130, near the receiver 115 of the affected channel 105 (i.e., the signal at the output of the transmitter 110 of the counter-propagating source channel 130) may be about 5 dB greater than the amplitude of the signal, in the co-propagating source channel 125, near the receiver 115 of the affected channel 105 (i.e., the signal at the input of the receiver 115 of the co-propagating source channel 130). In some embodiments, the crosstalk at 16 GHZ, from the counter-propagating source channel 130 to the affected channel 105, may be about −20 dB (relative to the non-crosstalk signal in the affected channel 105), which may be insufficiently low to meet system requirements (e.g., requirements (e.g., in a UCIe system) that the crosstalk be less than −26.5 dB).

Figure 2:
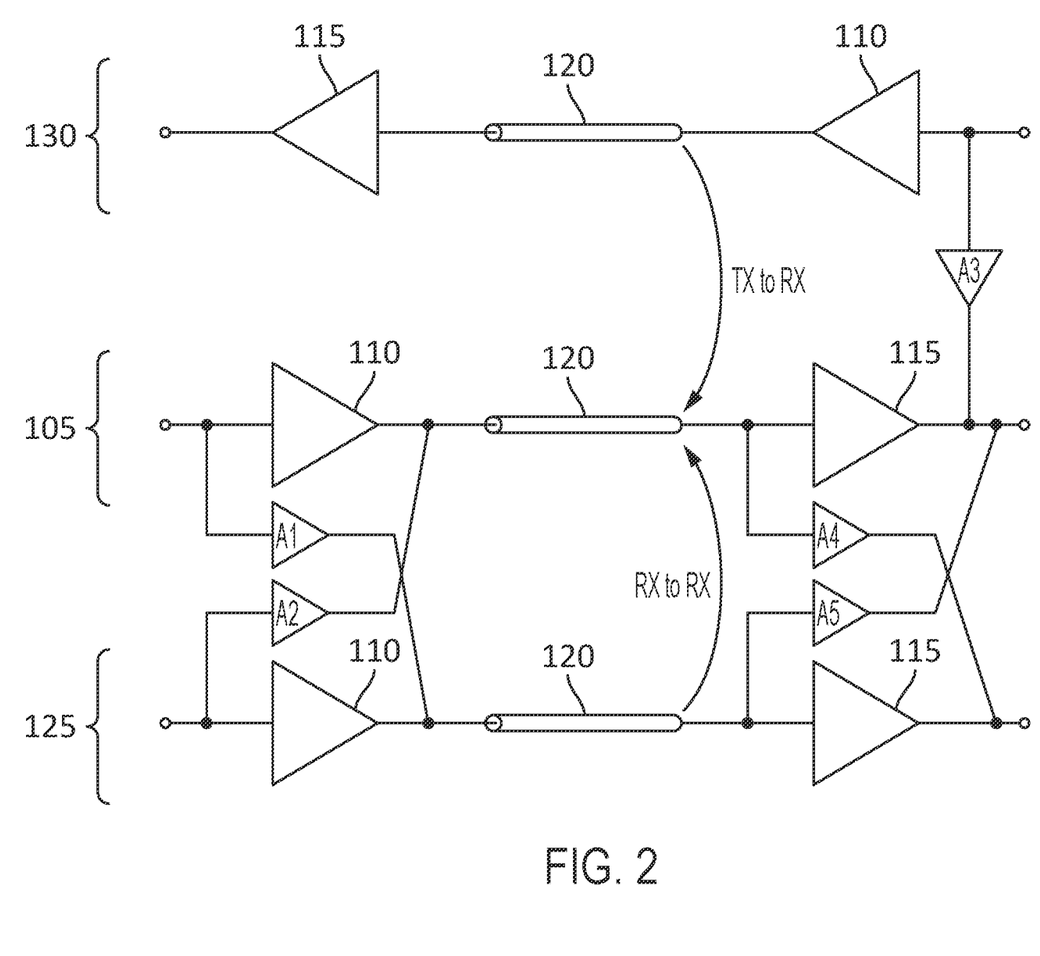
FIG. 2 is a schematic drawing of a portion of an array of communications channels, with a plurality of crosstalk reduction circuits, according to an embodiment of the present disclosure.

Referring to FIG. 2, in some embodiments, crosstalk reduction may be performed by one or more crosstalk reduction circuits (which, if there are several, may be considered parts of a single crosstalk reduction circuit). For example, crosstalk from the co-propagating source channel 125 to the affected channel 105 may be reduced by a first crosstalk reduction circuit A2 or by a second crosstalk reduction circuit A5, or both. The first crosstalk reduction circuit A2 may receive a signal from the input of the transmitter 110 of the co-propagating source channel 125, adjust its amplitude and delay to form a correction signal, and modify the signal at the output of the transmitter 110 of the affected channel 105 (e.g., by adding the correction signal to the signal generated by the transmitter 110 of the affected channel 105). Similarly, the second crosstalk reduction circuit A5 may receive a signal from the input of the receiver 115 of the co-propagating source channel 125, adjust its amplitude and delay to form a correction signal, and modify the signal at the output of the receiver 115 of the affected channel 105 (e.g., by adding the correction signal to the signal generated by the receiver 115 of the affected channel 105).

A third crosstalk reduction circuit A3 may be used to reduce crosstalk from the counter-propagating source channel 130 to the affected channel 105. The third crosstalk reduction circuit may receive a signal from the input of the transmitter 110 of the counter-propagating source channel 130, adjust its amplitude and delay to form a correction signal, and modify the signal at the output of the receiver 115 of the affected channel 105 (e.g., by adding the correction signal to the signal generated by the receiver 115 of the affected channel 105). In some embodiments, a crosstalk reduction circuit is also used to adjust the amplitude and delay of a signal at the output of the receiver 115 of the counter-propagating source channel 130 to form a correction signal, and to add this correction signal to the signal at the output of the transmitter 110 of the affected channel 105. In the embodiment of FIG. 2 such a crosstalk reduction circuit is absent, however, because (i) the source signal is weaker (e.g., 5 dB weaker) at the receiving end of the counter-propagating source channel 130 than at the transmitting end of the counter-propagating source channel 130 and (ii) the signal in the affected channel 105 (with which the crosstalk would interfere) is stronger (e.g., 5 dB stronger) at the transmitting end of the affected channel 105 than at the receiving end of the affected channel 105. As such, the amplitude of the interfering crosstalk signal from the counter-propagating source channel 130, relative to the signal, in the affected channel 105, with which it is interfering, may be about 10 dB less at the transmitting end of the affected channel 105 than at the receiving end of the affected channel 105.

Figure 3:
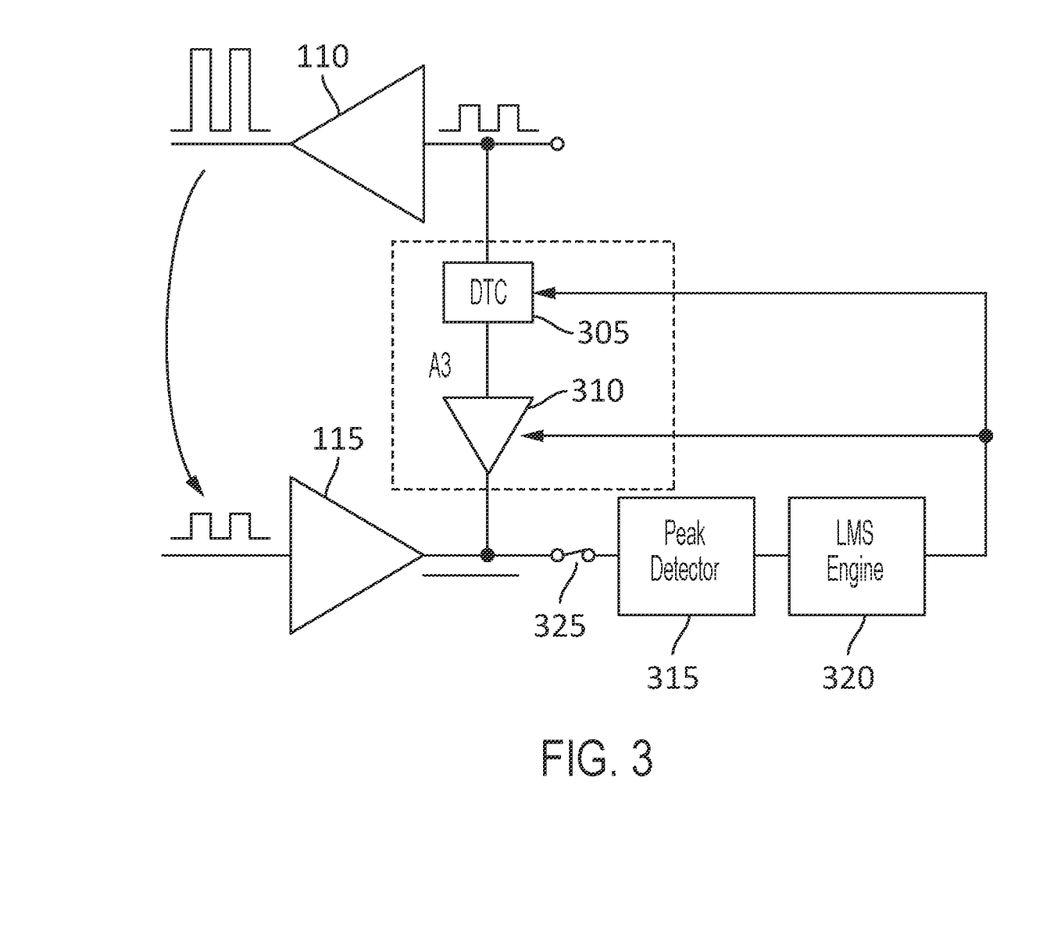
FIG. 3 is a schematic drawing of a system for adjusting a crosstalk reduction circuit for reducing crosstalk from a transmitter of a counter-propagating source channel, according to an embodiment of the present disclosure.

FIG. 3 is a schematic drawing of a system for adjusting a crosstalk reduction circuit, in some embodiments. The third crosstalk reduction circuit A3 may, as shown, be or include an amplifier with adjustable delay and adjustable gain. The adjustable delay may be provided by a digital to time converter (DTC) 305 which may be or include, for example, a shunt varactor the bias of which is controlled by a digital to analog converter. The adjustable gain may be a variable gain amplifier 310 (e.g., an amplifier with a variable resistor in the feedback, or a variable attenuator (e.g., an attenuator constructed with one or more positive-intrinsic-negative (PIN) diodes), or the combination of a fixed-gain amplifier and a variable attenuator). In some embodiments, the crosstalk reduction circuit has a gain less than one. As used herein, an "amplifier" is a substantially linear circuit element with a substantially flat frequency response (e.g., with a gain that is substantially frequency independent over the operating frequency range), and which has a gain that may be greater than one or less than one. As such, an attenuator is an example of an amplifier as the term "amplifier" is used herein.

The circuit of FIG. 3 also includes an adjusting circuit including an amplitude detector, e.g., a peak detector 315 (which may include a rectifier, a capacitor, and a reset switch), and an optimizing engine (which may be or include a processing circuit), e.g., a Least Mean Squares (LMS) engine 320. To set the adjustable gain and the adjustable delay of the third crosstalk reduction circuit A3, the transmitter 110 of the affected channel 105 may be turned off, and the transmitter 110 of the counter-propagating source channel 130 may be turned on and set to transmit a signal (e.g., a square wave, as shown). The Least Mean Squares engine 320 may then iteratively adjust the digital to time converter 305 and the variable gain amplifier 310 so as to minimize the signal at the output of the receiver 115 of the affected channel 105. At each iteration, the Least Mean Squares engine 320 may (i) set a new tentative value for the gain, (ii) set a new tentative value for the delay, (iii) reset the peak detector 315 and wait for the peak detector 315 to measure a new peak value, and (iv) read the peak detector. This minimizing may be complete when the signal produced by the third crosstalk reduction circuit A3 nearly or completely cancels the signal caused by crosstalk from the counter-propagating source channel 130 to the affected channel 105. Each of the digital to time converter 305 and the variable gain amplifier 310 may be controlled by a register storing a digital control value. The values in these registers may be adjusted, during the iterative adjustments performed by the Least Mean Squares engine 320. The registers may be nonvolatile, so that it may be sufficient to perform the adjustment once, e.g., at the time of manufacture of the circuit.

A switch 325 may connect the adjusting circuit to the output of the receiver 115 of the affected channel 105 while the delay and gain are adjusted as described above. Once the adjustment is complete the switch may be opened, and another, analogous switch, connecting the adjusting circuit to the output of the receiver 115 of another channel, may be closed, so that the adjusting circuit may then be used to adjust the gain and delay of a crosstalk reduction circuit for that other channel. This process may be repeated for each of a plurality of channels.

Figure 4:
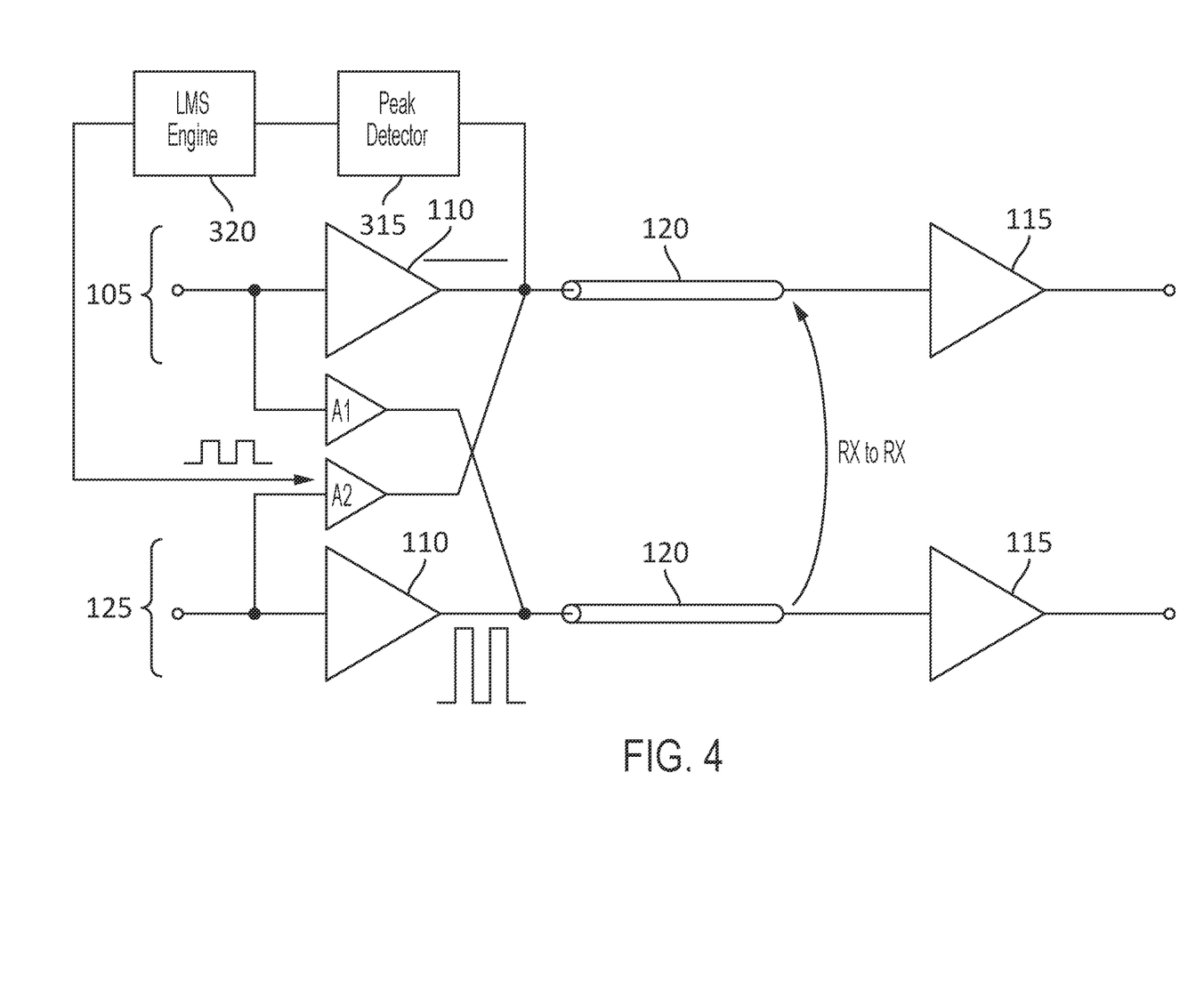
FIG. 4 is a schematic drawing of a system for adjusting a crosstalk reduction circuit for reducing crosstalk from a transmitter end of a co-propagating source channel, according to an embodiment of the present disclosure.

As illustrated in FIG. 4, an analogous method may be used to adjust the gain and delay of the first crosstalk reduction circuit A2. For example, the transmitter 110 of the affected channel 105 may be turned off, and the transmitter 110 of the co-propagating source channel 125 may be turned on and set to transmit a signal (e.g., a square wave, as shown). The Least Mean Squares engine 320 may then be used to adjust the gain and the delay of the first crosstalk reduction circuit A2 so as the minimize the signal at the output of the transmitter 110 of the affected channel 105, a condition that may occur when the signal produced by the first crosstalk reduction circuit A2 nearly or completely cancels the signal caused by crosstalk from the co-propagating source channel 125, at the transmitter end of the co-propagating source channel 125, to the affected channel 105.

Figure 5:
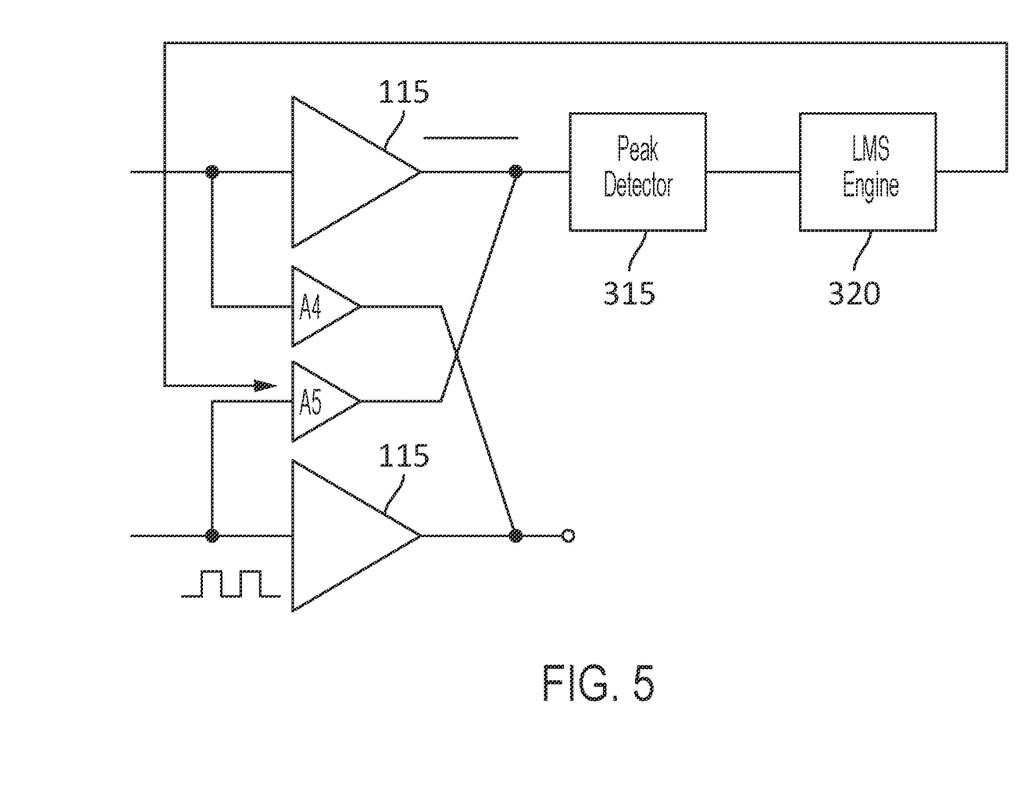
FIG. 5 is a schematic drawing of a system for adjusting a crosstalk reduction circuit for reducing crosstalk from a receiver end of a co-propagating source channel, according to an embodiment of the present disclosure.

As illustrated in FIG. 5, an analogous method may be used to adjust the gain and delay of the second crosstalk reduction circuit A5. For example, the transmitter 110 of the affected channel 105 may be turned off, and the transmitter 110 of the co-propagating source channel 125 may be turned on and set to transmit a signal (e.g., a square wave, as shown). The Least Mean Squares engine 320 may then be used to adjust the gain and the delay of the second crosstalk reduction circuit A5 so as the minimize the signal at the output of the receiver 115 of the affected channel 105, a condition that may occur when the signal produced by the second crosstalk reduction circuit A5 nearly or completely cancels the signal caused by the remaining crosstalk (after partial cancellation by the first crosstalk reduction circuit A2) from the co-propagating source channel 125, to the affected channel 105. The adjustment illustrated in FIG. 5 may be performed after the adjustment of FIG. 4, and with the first crosstalk reduction circuit A2 turned on, so that once the adjustment illustrated in FIG. 5 is complete, the combination of (i) all crosstalk from the co-propagating source channel 125 to the affected channel 105, (ii) the correction signal of the first crosstalk reduction circuit A2, and (iii) the correction signal of the second crosstalk reduction circuit A5 is nearly or exactly zero.

The summing of each correction signal (e.g., the correction signals produced by the first crosstalk reduction circuit A2, the second crosstalk reduction circuit A5, and the third crosstalk reduction circuit A3) with the signals propagating in the affected channel 105 may be done by suitable couplers. For example, directional couplers (each of which may include a length of transmission line parallel to the transmission line of the affected channel 105) may be used, or each of the crosstalk reduction circuits may be constructed to have a sufficiently high output impedance that connecting the output of the crosstalk reduction circuit directly to a point on a transmission line of the affected channel 105 does not result in significant reflections or return loss degradation.

FIG. 2 shows, in addition to the crosstalk reduction circuits (the first crosstalk reduction circuit A2, the second crosstalk reduction circuit A5, and the third crosstalk reduction circuit A3) used to reduce crosstalk affecting the first channel 105 (referred to above as the affected channel 105), a fourth crosstalk reduction circuit A1 and a fifth crosstalk reduction circuit A4, both of which may be used to reduce crosstalk produced in the second channel by the first channel (i.e., when the first channel is the source channel of the crosstalk and the second channel is the channel affected by the crosstalk). The delay and gain of each of the fourth crosstalk reduction circuit A1 and the fifth crosstalk reduction circuit A4 may be set by methods analogous to those of FIGS. 4 and 5. In some embodiments, the geometry of the conductors of the first and second channels may be sufficiently similar that the amplitude and phase with which crosstalk couples from the first channel into the second channel are substantially the same as the amplitude and phase with which crosstalk couples from the second channel into the first channel. Under such circumstances, it may be acceptable to set the gain and delay of the fourth crosstalk reduction circuit A1 to be the same as the gain and delay of the first crosstalk reduction circuit A2 and to set the gain and delay of the fifth crosstalk reduction circuit A4 to be the same as the gain and delay of the second crosstalk reduction circuit A5.

Figure 6:
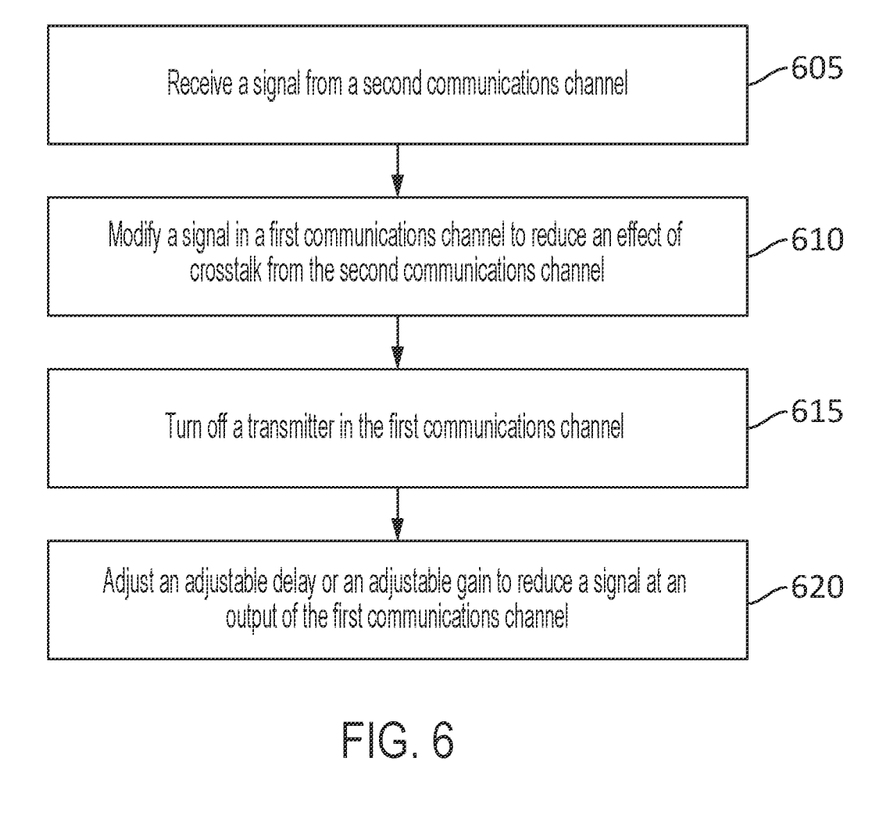
FIG. 6 is a flowchart of a method, according to an embodiment of the present disclosure.

FIG. 6 is a flowchart of a method, in some embodiments. The method includes reducing the effect of crosstalk in a first communications channel by receiving, at 605, by a crosstalk reduction circuit, a signal from a second communications channel, and modifying, at 610, by the first crosstalk reduction circuit, a signal in the first communications channel, to reduce an effect of crosstalk from the second communications channel. The method may further include turning off, at 615, a transmitter in the first communications channel, and adjusting, at 620, the adjustable delay or the adjustable gain to reduce a signal at an output of the first communications channel.

The crosstalk reduction circuit may be part of a system that includes a first communications channel and the crosstalk reduction circuit. The first communications channel may be, for example, a short serial connection between two semiconductor chips, or "dies" in a multi-chip package. The crosstalk reduction circuit may be configured to reduce the effect of crosstalk between a plurality of communications channels in the system. The crosstalk reduction circuit may receive the signal from the second communications channel through a conductor (e.g., an amplifier input) connected to a conductor of the second communications channel.

The crosstalk reduction circuit may modify the signal in the first communications channel by, for example, adding a correction signal to the signal generated by a receiver of the first communications channel. To adjust the magnitude and phase of the crosstalk reduction circuit, the transmitter of the first communications channel may be turned off, so that the signal received by the receiver of the first communications channel is primarily a crosstalk signal. The correction signal may then be adjusted (e.g., an adjustable delay or an adjustable gain of the crosstalk reduction circuit may be adjusted) so as to reduce or minimize the received (crosstalk) signal.

In general, crosstalk may occur between any two communications channels in an array (e.g., it need not be limited to adjacent channels). The transfer function of an array of communications channels may be represented by a transfer function matrix that, in the absence of crosstalk is a diagonal matrix (e.g., an identity matrix), and in which the off-diagonal elements correspond to crosstalk. The effect of the crosstalk reduction circuits (some of which may be connected between non-adjacent channels) may be to add to the transfer function matrix a correction matrix having only off-diagonal elements, each of the off-diagonal elements having substantially the same sign as a corresponding off-diagonal element of the transfer function matrix, and a phase that is substantially the opposite of the phase of the corresponding off-diagonal element of the transfer function matrix. As a result, the sum of the transfer function matrix and the correction matrix may be a diagonal matrix (e.g., it may be an identify matrix).

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

It will be understood that when an element is referred to as being "directly connected" or "directly coupled" to another element, there are no intervening elements present. As used herein, "generally connected" means connected by an electrical path that may contain arbitrary intervening elements, including intervening elements the presence of which qualitatively changes the behavior of the circuit. As used herein, "connected" means (i) "directly connected" or (ii) connected with intervening elements, the intervening elements being ones (e.g., low-value resistors or inductors, or short sections of transmission line) that do not qualitatively affect the behavior of the circuit.

Some embodiments may include features of the following numbered statements.

1. A system, comprising:
   a first communications channel; and
   a first crosstalk reduction circuit,
   the first communications channel being a wired communications channel, and
   the first crosstalk reduction circuit being configured to:
      receive a signal from a second communications channel; and
      modify a signal in the first communications channel to reduce an effect of crosstalk from the second communications channel.

2. The system of statement 1, wherein the first crosstalk reduction circuit comprises an amplifier circuit having an input configured to be connected to a conductor of the second communications channel and an output connected to a conductor of the first communications channel.

3. The system of statement 1 or statement 2, wherein:
   the first crosstalk reduction circuit comprises an amplifier circuit having an input configured to be connected to a conductor of the second communications channel and an output connected to a conductor of the first communications channel; and
   the conductor of the first communications channel is at least one of:
      an output of a receiver of the first communications channel, and
      an output of a transmitter of the first communications channel.

4. The system of any one of the preceding statements, wherein:
   the first crosstalk reduction circuit comprises an amplifier circuit connected to the first communications channel, and
   the amplifier circuit has at least one of:
      an adjustable delay, and
      an adjustable gain.

5. The system of any one of the preceding statements, wherein:
   the first crosstalk reduction circuit comprises an amplifier circuit connected to the first communications channel, and
   the system further comprises at least one of:
      an adjusting circuit configured to adjust an adjustable delay of the amplifier circuit, and
      an adjusting circuit configured to adjust an adjustable gain of the amplifier circuit.

6. The system of any one of the preceding statements, further comprising a peak detector configured to be connected to a conductor of the first communications channel, and a Least Mean Squares engine connected to the peak detector.

7. The system of any one of the preceding statements, further comprising:
   the second communications channel; and
   a second crosstalk reduction circuit,
   the second crosstalk reduction circuit being configured to:
      receive a signal from the first communications channel; and
      modify a signal in the second communications channel to reduce an effect of crosstalk from the first communications channel.

8. The system of any one of the preceding statements, further comprising:
   the second communications channel; and a second crosstalk reduction circuit,
wherein the second crosstalk reduction circuit comprises
an amplifier circuit having an input configured to be connected to a conductor of the first communications channel and an output connected to a conductor of the second communications channel.
9. The system of any one of the preceding statements, further comprising:
the second communications channel;
a second crosstalk reduction circuit; and
an adjusting circuit,
wherein the adjusting circuit is configured:
to set a gain setting of an amplifier circuit of the second crosstalk reduction circuit to be equal to a gain setting of an amplifier circuit of the first crosstalk reduction circuit; and
to set a delay setting of an amplifier circuit of the second crosstalk reduction circuit to be equal to a delay setting of an' amplifier circuit of the first crosstalk reduction circuit.
10. The system of any one of the preceding statements, further comprising:
the second communications channel; and
a second crosstalk reduction circuit,
wherein the first communications channel is a Pulse Amplitude Modulation (PAM) communications channel or a non-return-to-zero channel.
11. The system of any one of the preceding statements, further comprising:
the second communications channel;
a peak detector; and
a Least Mean Squares engine,
the peak detector is configured to be connected to a conductor of the second communications channel; and
the Least Mean Squares engine is connected to the peak detector.
12. The system of any one of the preceding statements, wherein the first communications channel is a Pulse Amplitude Modulation (PAM) communications channel or a non-return-to-zero channel.
13. A method, comprising:
reducing an effect of crosstalk in a system comprising:
a first communications channel; and
a crosstalk reduction circuit,
the crosstalk being crosstalk in the first communications channel from a second communications channel,
the reducing comprising:
receiving, by the crosstalk reduction circuit, a signal from the second communications channel; and
modifying, by the crosstalk reduction circuit, a signal in the first communications channel to reduce an effect of crosstalk from the second communications channel.
14. The method of statement 13, wherein the crosstalk reduction circuit comprises an amplifier circuit having an input configured to be connected to a conductor of the second communications channel and an output connected to a conductor of the first communications channel.
15. The method of statement 13 or statement 14, wherein:
the crosstalk reduction circuit comprises an amplifier circuit having an input configured to be connected to a conductor of the second communications channel and an output connected to a conductor of the first communications channel; and
the conductor of the first communications channel is at least one of:
an output of a receiver of the first communications channel, and
an output of a transmitter of the first communications channel.
16. The method of any one of the preceding statements, wherein:
the crosstalk reduction circuit comprises an amplifier circuit having an input configured to be connected to a conductor of the second communications channel and an output connected to a conductor of the first communications channel; and
the amplifier circuit has an adjustable delay and an adjustable gain.
17. The method of any one of the preceding statements, wherein:
the crosstalk reduction circuit comprises an amplifier circuit having an adjustable delay and an adjustable gain; and
the system further comprises:
an adjusting circuit configured to adjust the adjustable delay of the amplifier circuit, and
an adjusting circuit configured to adjust the adjustable gain of the amplifier circuit.
18. The method of any one of the preceding statements, wherein:
the system further comprises a peak detector and a Least Mean Squares engine;
the peak detector is configured to be connected to a conductor of the first communications channel; and
the Least Mean Squares engine is connected to the peak detector.
19. The method of any one of the preceding statements, wherein:
the crosstalk reduction circuit comprises an amplifier circuit having an adjustable delay and an adjustable gain; and
the method comprises:
turning off a transmitter in the first communications channel; and
adjusting the adjustable delay or the adjustable gain to reduce a signal at an output of the first communications channel.
20. A system, comprising:
a first communications channel;
a crosstalk reduction circuit;
a processing circuit; and
memory, operatively connected to the processing circuit,
the crosstalk reduction circuit being configured to:
receive a signal from a second communications channel, and
modify a signal in the first communications channel to reduce an effect of crosstalk from the second communications channel; and
the memory storing instructions that, when executed by the processing circuit, cause the system to perform a method, the method comprising:
turning off a transmitter in the first communications channel, and
adjusting an adjustable delay of the processing circuit or an adjustable gain of the processing circuit to reduce a signal at an output of the first communications channel.

Although exemplary embodiments of systems and methods for crosstalk suppression have been specifically described and illustrated herein, many modifications and variations will be apparent to those skilled in the art. Accordingly, it is to be understood that systems and methods for crosstalk suppression constructed according to principles of this disclosure may be embodied other than as specifically described herein. The invention is also defined in the following claims, and equivalents thereof.

What is claimed is:

1. A system, comprising:
a first communications channel; and
a first crosstalk reduction circuit,
the first communications channel being a wired communications channel, and
the first crosstalk reduction circuit being configured to:
receive a first signal from a second communications channel;
adjust amplitude and delay of the first signal to form a correction signal; and
modify a second signal in the first communications channel by adding the correction signal to reduce an effect of crosstalk from the second communications channel.

2. The system of claim 1, wherein the first crosstalk reduction circuit comprises an amplifier circuit having an input configured to be connected to a conductor of the second communications channel and an output connected to a conductor of the first communications channel.

3. The system of claim 1, wherein:
the first crosstalk reduction circuit comprises an amplifier circuit having an input configured to be connected to a conductor of the second communications channel and an output connected to a conductor of the first communications channel; and
the conductor of the first communications channel is at least one of:
an output of a receiver of the first communications channel, and
an output of a transmitter of the first communications channel.

4. The system of claim 1, wherein:
the first crosstalk reduction circuit comprises an amplifier circuit connected to the first communications channel, and
the amplifier circuit has at least one of:
an adjustable delay, and
an adjustable gain.

5. The system of claim 1, wherein:
the first crosstalk reduction circuit comprises an amplifier circuit connected to the first communications channel, and
the system further comprises at least one of:
an adjusting circuit configured to adjust an adjustable delay of the amplifier circuit, and
an adjusting circuit configured to adjust an adjustable gain of the amplifier circuit.

6. The system of claim 1, further comprising a peak detector configured to be connected to a conductor of the first communications channel, and a Least Mean Squares engine connected to the peak detector.

7. The system of claim 1, further comprising:
the second communications channel; and
a second crosstalk reduction circuit,
the second crosstalk reduction circuit being configured to:
receive a signal from the first communications channel; and
modify a signal in the second communications channel to reduce an effect of crosstalk from the first communications channel.

8. The system of claim 1, further comprising:
the second communications channel; and
a second crosstalk reduction circuit,
wherein the second crosstalk reduction circuit comprises an amplifier circuit having an input configured to be connected to a conductor of the first communications channel and an output connected to a conductor of the second communications channel.

9. The system of claim 1, further comprising:
the second communications channel;
a second crosstalk reduction circuit; and
an adjusting circuit,
wherein the adjusting circuit is configured:
to set a gain setting of an amplifier circuit of the second crosstalk reduction circuit to be equal to a gain setting of an amplifier circuit of the first crosstalk reduction circuit; and
to set a delay setting of an amplifier circuit of the second crosstalk reduction circuit to be equal to a delay setting of an' amplifier circuit of the first crosstalk reduction circuit.

10. The system of claim 1, further comprising:
the second communications channel; and
a second crosstalk reduction circuit,
wherein the first communications channel is a Pulse Amplitude Modulation (PAM) communications channel or a non-return-to-zero channel.

11. The system of claim 1, further comprising:
the second communications channel;
a peak detector; and
a Least Mean Squares engine,
the peak detector is configured to be connected to a conductor of the second communications channel; and
the Least Mean Squares engine is connected to the peak detector.

12. The system of claim 1, wherein the first communications channel is a Pulse Amplitude Modulation (PAM) communications channel or a non-return-to-zero channel.

13. A method, comprising:
reducing an effect of crosstalk in a system comprising:
a first communications channel; and
a crosstalk reduction circuit,
the crosstalk being crosstalk in the first communications channel from a second communications channel,
the reducing comprising:
receiving, by the crosstalk reduction circuit, a first signal from the second communications channel;
adjusting, by the crosstalk reduction circuit, amplitude and delay of the first signal to form a correction signal; and
modifying, by the crosstalk reduction circuit, a second signal in the first communications channel by adding the correction signal to reduce an effect of crosstalk from the second communications channel.

14. The method of claim 13, wherein the crosstalk reduction circuit comprises an amplifier circuit having an input configured to be connected to a conductor of the second communications channel and an output connected to a conductor of the first communications channel.

15. The method of claim 13, wherein:
the crosstalk reduction circuit comprises an amplifier circuit having an input configured to be connected to a conductor of the second communications channel and an output connected to a conductor of the first communications channel; and
the conductor of the first communications channel is at least one of:
an output of a receiver of the first communications channel, and an output of a transmitter of the first communications channel.

16. The method of claim 13, wherein:
the crosstalk reduction circuit comprises an amplifier circuit having an input configured to be connected to a conductor of the second communications channel and an output connected to a conductor of the first communications channel; and
the amplifier circuit has an adjustable delay and an adjustable gain.

17. The method of claim 13, wherein:
the crosstalk reduction circuit comprises an amplifier circuit having an adjustable delay and an adjustable gain; and
the system further comprises:
an adjusting circuit configured to adjust the adjustable delay of the amplifier circuit, and
an adjusting circuit configured to adjust the adjustable gain of the amplifier circuit.

18. The method of claim 13, wherein:
the system further comprises a peak detector and a Least Mean Squares engine;
the peak detector is configured to be connected to a conductor of the first communications channel; and
the Least Mean Squares engine is connected to the peak detector.

19. The method of claim 13, wherein:
the crosstalk reduction circuit comprises an amplifier circuit having an adjustable delay and an adjustable gain; and
the method comprises:
turning off a transmitter in the first communications channel; and
adjusting the adjustable delay or the adjustable gain to reduce a signal at an output of the first communications channel.

20. A system, comprising:
a first communications channel;
a crosstalk reduction circuit;
a processing circuit; and
memory, operatively connected to the processing circuit,
the crosstalk reduction circuit being configured to:
receive a signal from a second communications channel, and
modify a signal in the first communications channel to reduce an effect of crosstalk from the second communications channel; and
the memory storing instructions that, when executed by the processing circuit, cause the system to perform a method, the method comprising:
turning off a transmitter in the first communications channel, and
adjusting an adjustable delay of the processing circuit or an adjustable gain of the processing circuit to reduce a signal at an output of the first communications channel.

* * * * *